Aug. 8, 1967   J. W. VON BRIMER   3,335,300
LINEAR INDUCTION MOTOR
Filed Aug. 27, 1964

INVENTOR.
JOE W. VON BRIMER
BY
Lyon & Lyon
ATTORNEYS

United States Patent Office 3,335,300
Patented Aug. 8, 1967

3,335,300
LINEAR INDUCTION MOTOR
Joe W. von Brimer, Van Nuys, Calif. (% VB Research & Development, 1700 Westwood Blvd., Los Angeles, Calif. 90024)
Filed Aug. 27, 1964, Ser. No. 392,658
3 Claims. (Cl. 310—13)

The present invention relates to electromagnetic structures in the general form of solenoids and has particular utility as a linear actuator having what may be termed an unlimited stroke.

Briefly, the arrangement described herein involves a laminated stator having one or more distributed windings thereon and an elongated straight channel member, acting generally as a "rotor," of nonmagnetic but conductive material such as aluminum or copper, this channel member having the flanges thereof cooperating with a laminated backing plate which serves to define a part of the return flux path for the stator and which serves also as a guide member for the channel member. By providing a movable or "rotor" element with flanges, the efficiency is enhanced and yet at the same time such flanges provide a part of the guide structure for guiding its movement.

It is therefore a general object of the present invention to provide improved means and techniques of the character described above.

A specific object of the present invention is to provide an improved linear actuator.

Another specific object of the present invention is to provide an improved linear actuator in which the movable element is shaped to produce enhanced efficiency with a subsidiary feature being that the element cooperates mechanically with a backing plate to guide its movement.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

The presently described arrangement has general utility in systems wherein movement of an element is desired to be effected over long distances, and one particular use of the same is in a drapery actuating system as described in my copending application Ser. No. 364,230, filed May 1, 1964.

Figure 1:
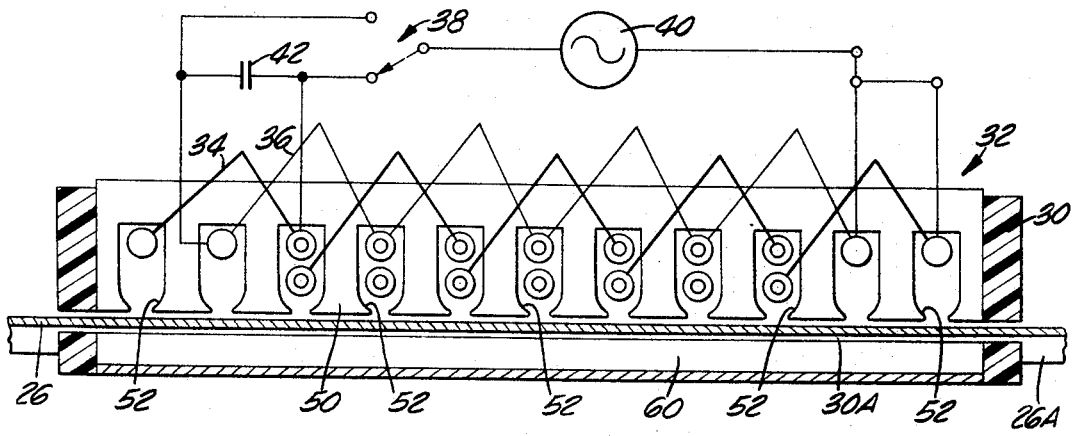
FIG. 1 illustrates a linear actuator embodying features of the present invention as well as electrical circuit connections thereto, also in accordance with features of the present invention.
Figure 2:
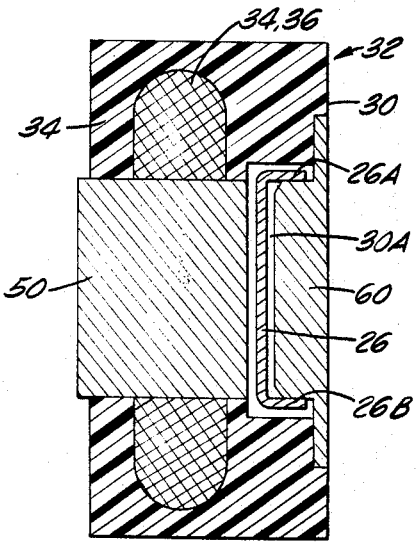
FIG. 2 is generally a transverse sectional view through the linear actuator shown in FIG. 1.

Referring to the drawings, the movable element of the actuator is illustrated in the form of a strip 26 of nonmagnetic but conductive material such as aluminum or copper, and the same is formed generally as a channel element, as seen in cross-section in FIG. 2. The strip 26 is slidably mounted in a channeled opening 30A extending through a magnetic drive structure 30 which may be stationarily mounted to form part of a linear actuator having the general reference numeral 32 with two windings 34 and 36 either one of which, as illustrated in FIG. 1, may be selectively energized to correspondingly move the strip 26 to the right or left in FIG. 1 by operating the single pole double pole switch 38 having its stationary contacts connected to correspondingly opposite ends of windings 34, 36 having its other ends connected to one terminal of A.C. source 40, the other terminal of source 40 being connected to the movable contact of switch 38, and the first mentioned ends of windings 34 and 36 being interconnected by capacitor 42.

The linear actuator includes a laminated magnetizable core member 50 having winding slots 52 with alternate ones of such slots having the legs of a coil which comprises the winding 36, and with the series of intermediate slots having the legs of a coil which comprises winding 34, the winding 34 being illustrated by more heavy lines. These windings when energized produce a magnetic flux which traverses the strip 26 and causes its relative movement; and a return path may be established for the flux by the elongated stationary laminated plate like element 60 of magnetizable material which cooperates also with the core member 50 in defining the previously mentioned opening 30A. The windings, if desired, may be encased in an insulating material 54.

It will be apparent that the linear motor 32 and specifically the strip 26 may be interposed or attached to an element in a system for producing many useful results.

Of importance is the generally U-shaped channel construction of strip 26 which has two legs 26A, 26B extending away from the core structure 50 and which partially embraces the laminated plate-like flux return element 60. The provision of these two ends or legs 26A, 26B results in increased efficiency besides serving as a part of a mechanical guide structure. The reason for this increased efficiency will become apparent if one considers the actuator as similar to a squirrel cage induction motor in which the primary coils are arranged in a straight line, rather than in a circle. A linearly moving magnetic field is produced when the coils are energized which causes the strip 26 to behave as if it consisted of a large number of transverse arrangements of small loop conductors carrying current in opposite directions along the length of the strip. The flanges, which are located in a region where they are not substantially affected by flux, then act in a manner analogous to the end rings of the squirrel cage rotor to complete or close the circular currents generated. Thus the efficiency is substantially higher than would be expected from eddy current principles.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A linear actuator comprising an elongated laminated member of magnetic material having a plurality of spaced winding slots, said slots extending transversely thereof and being spaced longitudinally, a winding on said member having legs thereof in said winding slots, a laminated plate mounted on said member and having a surface thereof spaced from said member to form an elongated passageway;
  and an elongated nonmagnetic but conductive member mounted for relative movement with respect to said laminated member in said passageway, said nonmagnetic but conductive member having legs extending out of the plane of said passageway cooperating with surfaces on said plate to serve as guides during said relative movement.
2. A linear actuator comprising an elongated laminated member of magnetic material having winding slots which extend transversely thereof and which are spaced longitudinally thereof;

a laminated backing plate mounted on said laminated member and defining with said member an elongated air gap;

a winding extending through said winding slots, said windings when energized with alternating current producing a moving magnetic field which moves longitudinally through said air gap;

and an elongated nonmagnetic electrically conductive strip mounted in said air gap for relative movement with respect to said laminated member, said strip having flanges extending away from said winding and engaging a portion of said backing plate to serve as a guide during said relative movement.

3. A linear actuator comprising an elongated laminated member of magnetic material having winding slots which extend transversely thereof and which are spaced longitudinally thereof;

a backing plate mounted on said laminated member and defining with said member a passageway constituting an elongated air gap;

a winding extending through said winding slots, said windings when energized with alternating current producing a moving magnetic field which moves longitudinally through said air gap;

and an elongated nonmagnetic electrically conductive strip mounted in said air gap for relative movement with respect to said laminated member and said plate, said strip being formed with a least one flange extending out of the plane of said passageway.

References Cited
UNITED STATES PATENTS

| Re. 12,700 | 10/1907 | Zehden | 310—13 |
| 1,896,418 | 2/1933 | Phelps | 310—13 X |
| 1,986,616 | 1/1935 | Baldwin | 310—13 |
| 2,831,131 | 4/1958 | Klots | 310—13 |
| 2,993,130 | 7/1961 | Laithwaite | 310—13 |
| 3,158,765 | 11/1964 | Polgreen | 318—135 X |
| 3,218,489 | 11/1965 | Sadler | 318—135 |

MILTON O. HIRSHFIELD, *Primary Examiner.*

D. F. DUGGAN, *Assistant Examiner.*